United States Patent
Grufman et al.

(10) Patent No.: US 10,777,000 B2
(45) Date of Patent: Sep. 15, 2020

(54) GARDEN STREET VIEW

(71) Applicant: HUSQVARNA AB, Huskvarna (SE)

(72) Inventors: Stefan Grufman, Bankeryd (SE); Björn Mannefred, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/539,865

(22) PCT Filed: Dec. 21, 2015

(86) PCT No.: PCT/IB2015/059858
§ 371 (c)(1),
(2) Date: Jun. 26, 2017

(87) PCT Pub. No.: WO2016/103164
PCT Pub. Date: Jun. 30, 2016

(65) Prior Publication Data
US 2017/0372514 A1    Dec. 28, 2017

Related U.S. Application Data

(60) Provisional application No. 62/097,050, filed on Dec. 27, 2014.

(51) Int. Cl.
*G06T 17/05* (2011.01)
*G05D 1/02* (2020.01)
(Continued)

(52) U.S. Cl.
CPC .......... *G06T 17/05* (2013.01); *G05D 1/0278* (2013.01); *G06F 3/04815* (2013.01);
(Continued)

(58) Field of Classification Search
CPC .... G06T 17/05; G06T 1/0014; G06F 3/04815
(Continued)

(56) References Cited

U.S. PATENT DOCUMENTS

2006/0075442 A1*  4/2006  Meadow ............... G06F 16/78
                                                              725/91
2008/0125996 A1   5/2008  Fitzhugh
(Continued)

FOREIGN PATENT DOCUMENTS

DE    102012020100 A1    4/2014
EP        1553536 A1    7/2005

OTHER PUBLICATIONS

International Search Report and Written Opinion for International Application No. PCT/IB2015/059858 dated May 4, 2016.
(Continued)

*Primary Examiner* — Shivang I Patel
(74) *Attorney, Agent, or Firm* — Burr & Forman, LLP

(57) ABSTRACT

A robotic vehicle may be configured to incorporate multiple sensors to make the robotic vehicle capable of collecting and uploading image data over time into the cloud to generate interactive garden models. In this regard, in some cases, the robotic vehicle may include an onboard vehicle positioning module and sensor network that may work together to give the robotic vehicle a collective understanding of its environment, and enable it to autonomously collect and upload image data for corresponding locations.

15 Claims, 11 Drawing Sheets

(51) Int. Cl.
*G06T 1/00* (2006.01)
*G06F 3/0481* (2013.01)
*G06T 19/00* (2011.01)
*G06T 19/20* (2011.01)
*G06T 7/73* (2017.01)
*G06T 7/246* (2017.01)
*G06F 3/0484* (2013.01)
*G06T 5/20* (2006.01)
*H04N 5/92* (2006.01)

(52) U.S. Cl.
CPC .......... *G06T 1/0007* (2013.01); *G06T 19/003* (2013.01); *G06T 19/20* (2013.01); *G05D 1/027* (2013.01); *G05D 1/0231* (2013.01); *G05D 2201/0208* (2013.01); *G06F 3/0484* (2013.01); *G06T 5/20* (2013.01); *G06T 7/248* (2017.01); *G06T 7/73* (2017.01); *G06T 2200/08* (2013.01); *G06T 2200/24* (2013.01); *G06T 2207/10032* (2013.01); *G06T 2207/30188* (2013.01); *G06T 2207/30252* (2013.01); *H04N 5/9201* (2013.01)

(58) Field of Classification Search
USPC ........................................................ 345/420
See application file for complete search history.

(56) References Cited

U.S. PATENT DOCUMENTS

| 2009/0202102 | A1 | 8/2009 | Miranda et al. | |
| 2013/0238130 | A1* | 9/2013 | Dorschel | A01D 34/008 700/259 |
| 2014/0032033 | A1* | 1/2014 | Einecke | A01D 34/008 701/24 |
| 2014/0043436 | A1* | 2/2014 | Bell | G06T 19/20 348/46 |
| 2014/0316636 | A1* | 10/2014 | Hong | G05D 1/0016 701/27 |
| 2016/0101524 | A1* | 4/2016 | Noh | B25J 9/1676 382/153 |
| 2016/0174459 | A1* | 6/2016 | Balutis | B25J 9/0081 701/25 |

OTHER PUBLICATIONS

International Preliminary Report on Patentability for International Application No. PCT/IB2015/059858 dated Jun. 27, 2017.

* cited by examiner

GARDEN STREET VIEW

CROSS REFERENCE TO RELATED APPLICATIONS

The present application claims priority to U.S. patent application No. 62/097,050 filed Dec. 27, 2014, which is expressly incorporated by reference in its entirety.

TECHNICAL FIELD

Example embodiments generally relate to robotic vehicles and, more particularly, relate to a robotic vehicle that is configurable to collect and aggregate image data over time to be used for a variety of applications.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

As technological capabilities have improved, various devices or sensors have been developed that are capable of employment to monitor various aspects of working conditions. However, even with the improvement of monitoring devices or sensors, robotic vehicles (e.g., robotic mowers) have been unable to collect and model image data over time via the cloud to provide more accurate and updated garden information. Thus, it may be desirable to expand the capabilities of robotic vehicles to improve their utility and functionality.

BRIEF SUMMARY OF SOME EXAMPLES

Some example embodiments may therefore provide a robotic vehicle that is configured to incorporate multiple sensors to make the robotic vehicle capable of collecting and uploading image data over time into the cloud to generate interactive garden models. In this regard, in some cases, the robotic vehicle may include an onboard vehicle positioning module and sensor network that may work together to give the robotic vehicle a collective understanding of its environment, and enable it to autonomously collect and upload image data for corresponding locations.

In an example embodiment, a robotic vehicle may be configured to incorporate multiple sensors to make the robotic vehicle capable of collecting and uploading image data over time into the cloud to generate interactive garden models. In this regard, in some cases, the robotic vehicle may include an onboard vehicle positioning module and sensor network that may work together to give the robotic vehicle a collective understanding of its environment, and enable it to autonomously collect and upload image data for corresponding locations.

In an example embodiment, a method of driving a display based on data gathered by a robotic vehicle is provided. The method may include receiving information indicative of position data of a robotic vehicle transiting a parcel and corresponding image data captured by the robotic vehicle at one or more locations on the parcel. The method may further include storing the image data associated with temporal information indicating when the image data was captured, and providing an interactive graphical display of at least some of the image data. The interactive graphical display may be generated based on both the position data and the temporal information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
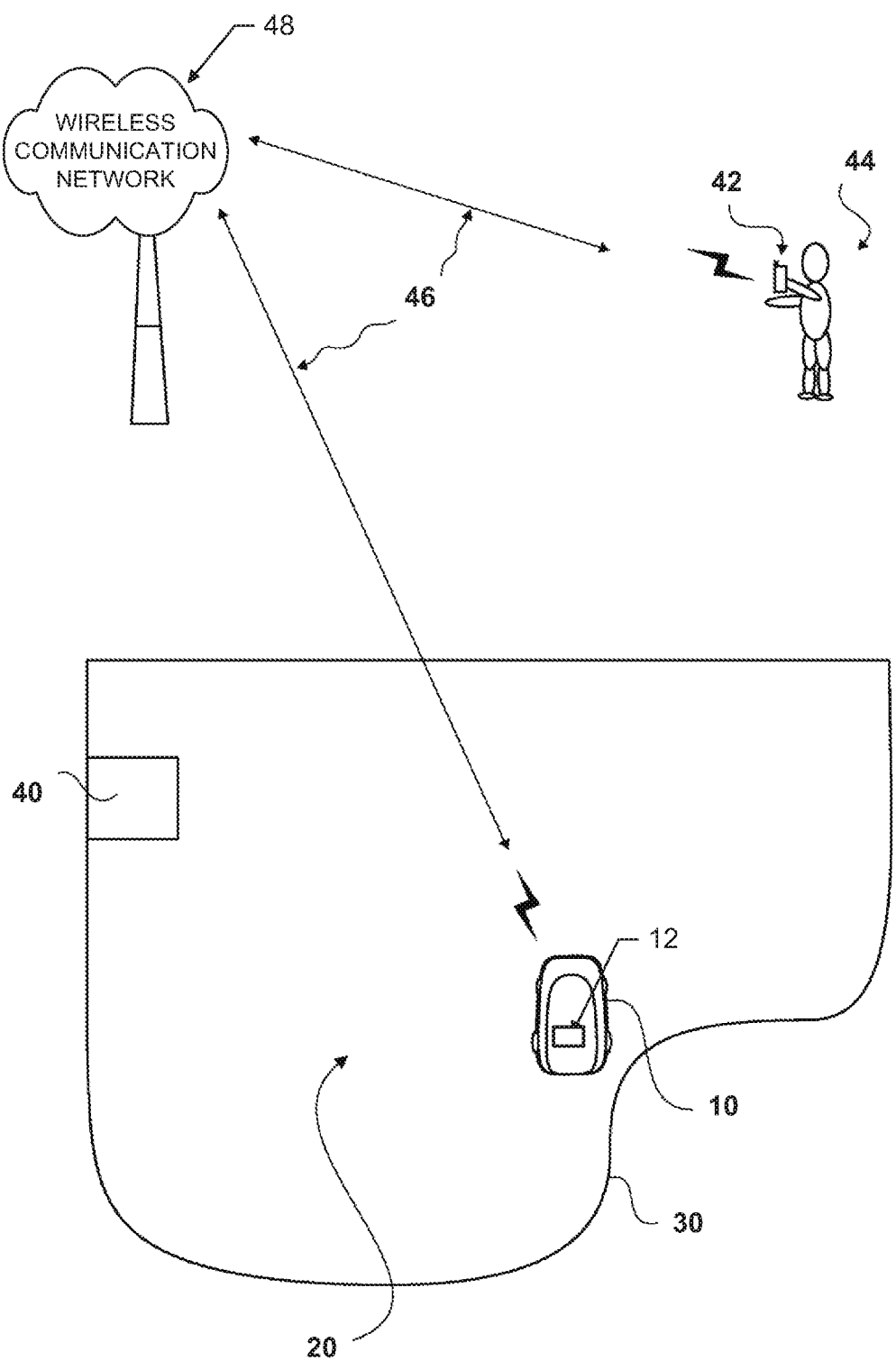
FIG. 1 illustrates an example operating environment for a robotic mower.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a robotic vehicle (e.g., a robotic mower, a mobile sensing device, a watering device and/or the like) is provided with a positioning module and a sensor network. The positioning module may be configured to utilize one or more sensors to determine a location of the robotic vehicle and direct continued motion of the robotic vehicle. The sensor network may be configured to collect data (e.g., image data). Other structures may also be provided, and other functions may also be performed as described in greater detail below.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached. Other robotic vehicles (e.g., a robotic watering vehicle) may operate in similarly defined areas, but an example embodiment will be described herein in connection with a robotic mower. However, it should be appreciated that example embodiments are not limited to application only on robotic mowers. Instead, example embodiments may also be practiced in connection with other robotic vehicles that operate within bounded regions.

The robotic mower 10 may be controlled, at least in part, via control circuitry 12 located onboard. The control circuitry 12 may include, among other things, a vehicle positioning module and a sensor network, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor network may gather data regarding the surroundings of the robotic mower 10 while the parcel 20 is traversed.

If a sensor network is employed, the sensor network may include sensors related to positional determination (e.g., a global positioning system (GPS) receiver, an inertial measurement unit (IMU), an accelerometer and/or the like). Thus, for example, positional determinations may be made using GPS, inertial navigation and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. In some cases, the sensors may also or alternatively collect image data regarding various parameters associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system and blades.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
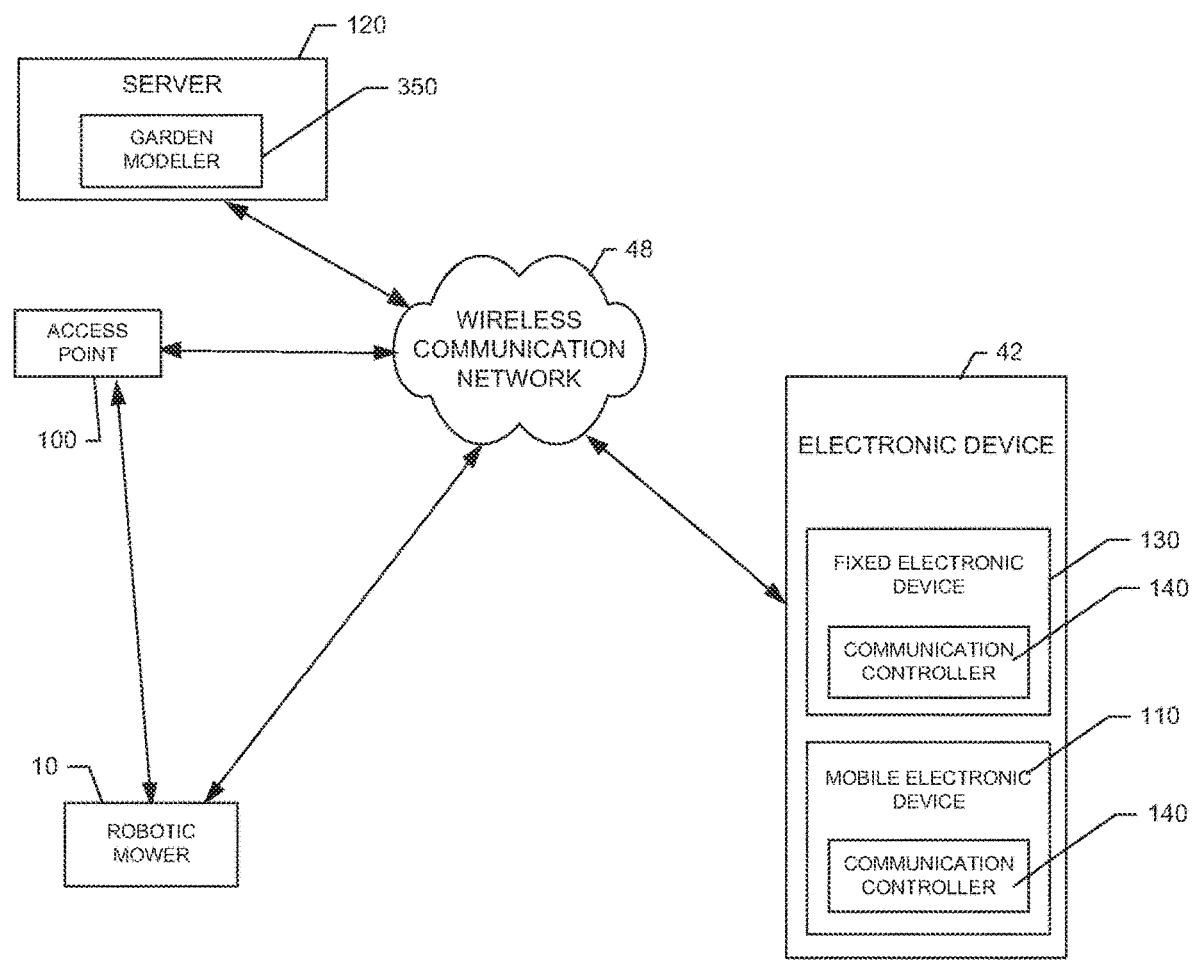
FIG. 2 illustrates a block diagram of a communication network of the robotic mower according to an example embodiment.

FIG. 2 illustrates a block diagram of various components that may be employed to facilitate modeling of image data in accordance with an example embodiment. As can be seen from FIG. 2, the wireless communication network 48 (e.g., the internet) may be capable of providing communication between the electronic device 42 and the robotic mower 10. When communication is established between the wireless communication network 48 and the robotic mower 10, the communication may be established using any suitable wireless communication mechanism such as, for example, second-generation (2G) wireless communication protocols IS-136 (TDMA), GSM, and IS-95 (CDMA), third-generation (3G) wireless communication protocols, such as UMTS, CDMA2000, WCDMA and TD-SCDMA, LTE or E-UTRAN, fourth-generation (4G) wireless communication protocols or the like. However, in some cases, a wireless access point 100 may be provided in association with the parcel 20 to serve the robotic mower 10. The wireless access point 100 may have a wired or wireless connection to the wireless communication network 48, and may then employ a short range communication protocol (e.g., WiFi, Bluetooth, or the like) to communicate with the robotic mower 10.

Regardless of the particular communication mechanism employed, it should be appreciated that user interaction between the electronic device 42 and the robotic mower 10 is facilitated by example embodiments. In some cases, information regarding the robotic mower 10, the parcel 20, the remote operator 44, account details associated with any of the foregoing, and/or the like, may be stored "in the cloud." For example, a server 120 may be provided as part of, or in communication with, the wireless communication network 48. The server 120 may include memory and/or processing components to store data and execute functionality associated with the employment of example embodiments. Thus, for example, instructions for operation of the robotic mower 10, data (e.g., image data, position data and/or the like) to be collected, registered users or devices, and/or other information may be stored at the server 120.

In some cases, the manufacturer may provide an identifier, vehicle identification number, or other such identifying information regarding each robotic vehicle produced to the server 120 (or an instance thereof). The identification information may uniquely identify each instance of robotic vehicle and enable each respective robotic vehicle to be registered to a user, organization, parcel and/or user account. The server 120 may therefore store account information and correlate various account settings, programs, instructions, applications and/or the like, with the account generally or in association with all or particular ones of the robotic vehicles registered to the account. In some examples, actions of the server 120 may be controlled, managed, or coordinated by a controlling device (e.g., garden modeler 350). The server 120 may interact with the electronic device 42 and/or the robotic mower 10 (or other robotic vehicles) individually in sequence or simultaneously in order to update, modify, execute or otherwise perform functions associated with the accounts and vehicles associated with the accounts.

In some embodiments, in addition or as an alternative to the mobile electronic device 110, the electronic device 42 could be embodied as a fixed electronic device 130 (e.g., a PC, computer terminal and/or the like). Thus, the remote operator 44 could be enabled to control the robotic mower 10 via the fixed electronic device 130 or via the mobile electronic device 110 (e.g., a smart phone, tablet, laptop, etc.). In some cases, the user 44 may be enabled to log into an account associated with the user 44 (or with the parcel 20, an organization responsible for the parcel 20, and/or the like) to manage tasks or data associated with the robotic mower 10 or with other robotic vehicles that may be associated with the account. In any case, a communication controller 140 may be embodied at the device from which instructions or other data/information associated with controlling the operation of the robotic mower 10 (or other robotic vehicles) associated with the account. The communication controller 140 may be used for interface on any electronic device 42 from which users access the Internet. Accordingly, for example, an instance of the communication controller 140 may be embodied at any (or each) device that is capable of remotely interacting with the robotic mower 10 (or other robotic vehicles).

Figure 3:
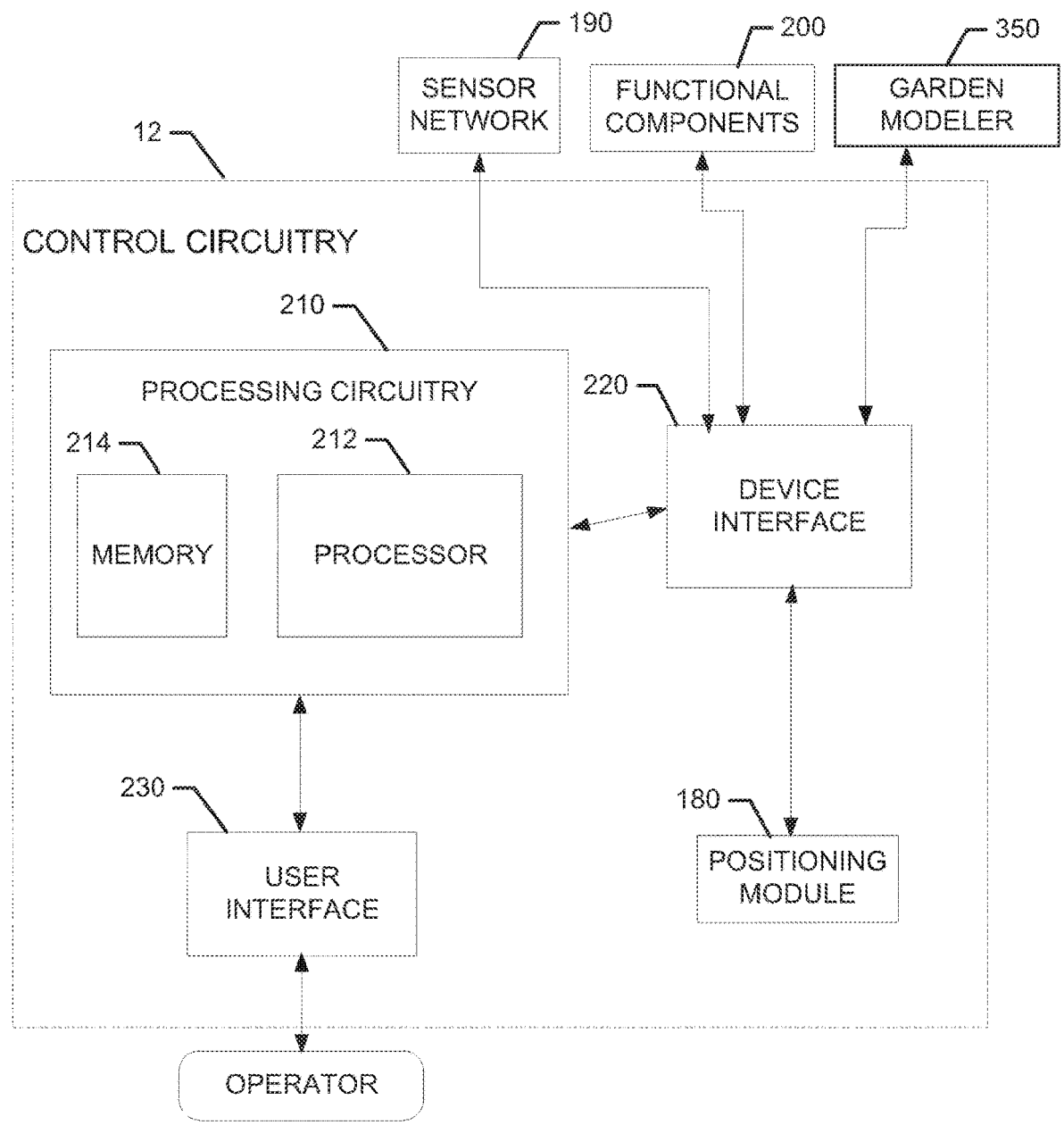
FIG. 3 illustrates a block diagram of various components of control circuitry to illustrate some of the components that enable or enhance the functional performance of the robotic mower and to facilitate description of an example embodiment.

Some examples of the interactions that may be enabled by example embodiments will be described herein by way of explanation and not of limitation. FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with a positioning module 180 and/or a sensor network 190 disposed at the robotic mower 10. As such, for example, the functions attributable to the positioning module 180 and/or the sensor network 190 may be carried out by, under the control of, or in cooperation with the control circuitry 12. In some embodiments, the positioning module 180 may be part of a sensor network 190 of the robotic mower 10. However, in some cases, the positioning module 180 may be in communication with the sensor network 190 to facilitate operation of each respective module.

The robotic mower 10 may also include one or more functional components 200 that may be controlled by the control circuitry 12 or otherwise be operated in connection with the operation of the robotic mower 10. The functional components 200 may include a wheel assembly (or other mobility assembly components), one or more cutting blades and corresponding blade control components, and/or other such devices. In embodiments where the robotic vehicle is not a mower, the functional components 200 may include equipment for taking soil samples, operating valves, distributing water, seed, powder, pellets or chemicals, and/or other functional devices and/or components.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the robotic mower 10 via a single data bus. As such, the data bus may connect to a plurality or all of the switching components and/or other electrically controlled components of the robotic mower 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the vehicle positioning module 180, the sensor network 190, and/or other functional components 200 of or associated with the robotic mower 10. As such, in some embodiments, the processor 212 (or the processing circuitry 210) may be said to cause each of the operations described in connection with the positioning module 180, the sensor network 190, and/or other functional components 200 by directing the positioning module 180, the sensor network 190, and/or other functional components 200, respectively, to undertake the corresponding functionalities responsive to execution of instructions or algorithms configuring the processor 212 (or processing circuitry 210) accordingly. These instructions or algorithms may configure the processing circuitry 210, and thereby also the robotic mower 10, into a tool for performing corresponding functions in the physical world in accordance with the instructions provided.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 180, the sensor network 190, and/or other functional components 200 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic mower 10. Among the contents of the memory 214, applications may be stored for execution by the processor 212 in order to carry out the functionality associated with each respective application.

In some cases, information associated with the positioning module 180 and/or the sensor network 190 may be extracted from the robotic mower 10 and mated with a remote network terminal or computer. The information stored on the memory 214 may then be extracted and thereby reported for fleet management or other applications. In other cases, the device interface 220 may be configured to wirelessly transmit information associated with the positioning module 180 and/or the sensor network 190 to a remote computer to enable data processing to be accomplished on the remote computer. For example, in some cases, Bluetooth, WiFi or other wireless communication modules may be provided by the device interface 220 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer. Thus, in some embodiments, image data and/or position data may be communicated to an external computer and may be manipulated thereat, or may be correlated to other image and/or position information (e.g., previously collected image data from a corresponding position).

The user interface 230 (if implemented) may be in communication with the processing circuitry 210 to receive an indication of a user input at the user interface 230 and/or to provide an audible, visual, mechanical or other output to the user 44. As such, the user interface 230 may include, for example, a display, one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely (e.g., the communication controller 140). In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the communication controller 140, the positioning module 180, the sensor network 190, and/or other functional components 200 via wired or wireless communication interfaces in a real-time manner, as a data package downloaded after data gathering or in one or more burst transmission of any kind.

The positioning module 180 may be any means such as a device or circuitry embodied in either hardware, or a combination of hardware and software that is configured to perform the corresponding functions described herein. Thus, the module may include hardware and/or instructions for execution on hardware (e.g., embedded processing circuitry) that is part of the control circuitry 12 of the robotic mower 10. The module may share some parts of the hardware and/or instructions that form each module, or they may be distinctly formed. As such, the module and components thereof are not necessarily intended to be mutually exclusive relative to each other from a compositional perspective.

The positioning module 180 may be configured to utilize one or more sensors (e.g., of the sensor network 190) to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and provide full coverage of the parcel 20 to ensure the entire parcel is mowed. The positioning module 180 may therefore be configured to direct movement of the robotic mower 10, including the speed of the robotic mower 10.

Various sensors of sensor network 190 of the robotic mower 10 may be included as a portion of, or otherwise communicate with, the positioning module 180 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver, inertial measurement unit (IMU), and/or accelerometer) may be included to monitor, display and/or record data regarding vehicle position and/or orientation as part of the positioning module 180.

Figure 4:
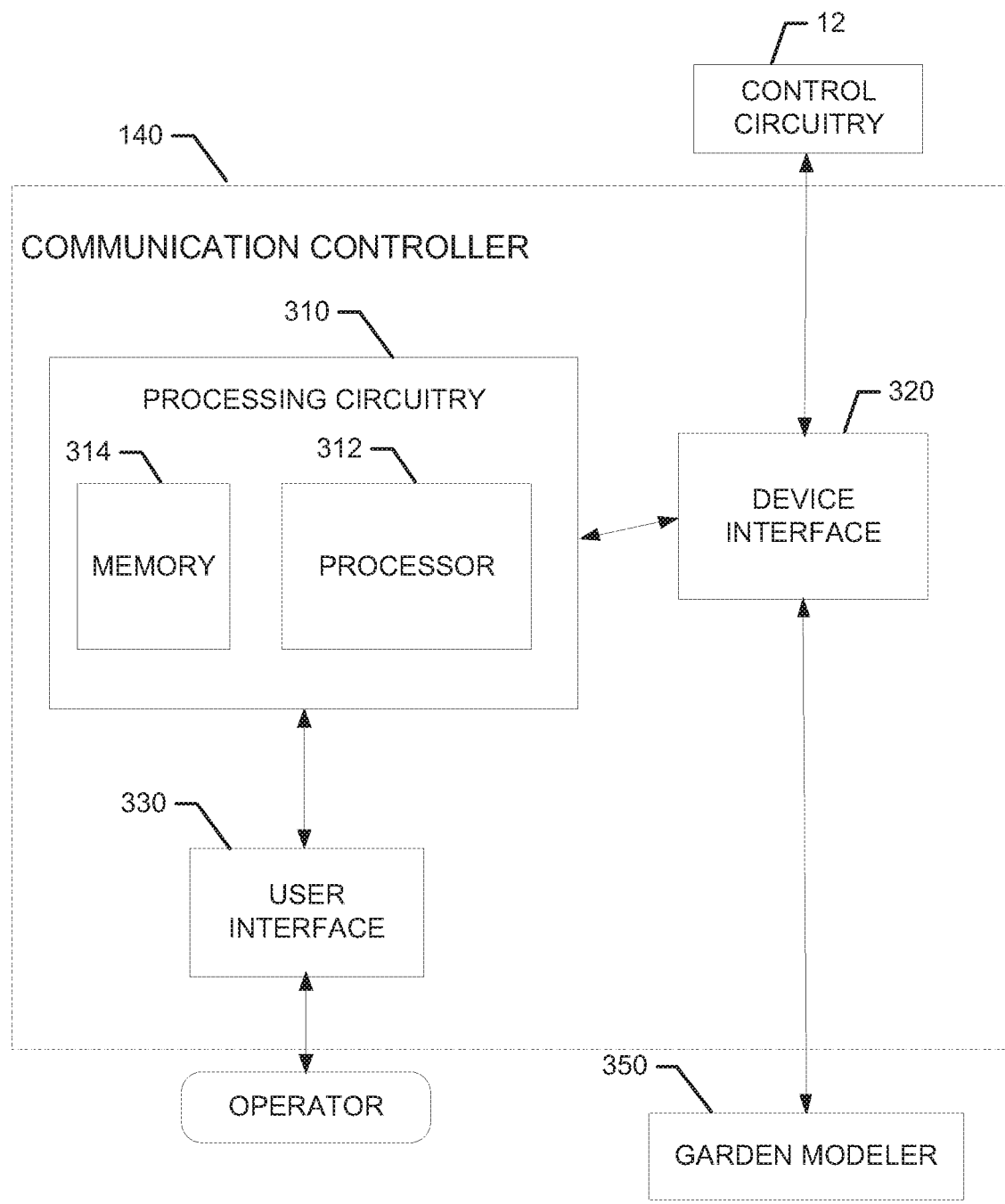
FIG. 4 illustrates a block diagram of various components of processing circuitry of an electronic device that can control the robotic mower remotely to illustrate some of the components that enable or enhance the functional performance of the electronic device and to facilitate description of an example embodiment.

In an example embodiment, as mentioned above, the communication controller 140 may interface with the control circuitry 12 of the robotic mower 10. The remote interaction may also be used for data gathering, data aggregation, task performance and/or the like. FIG. 4 illustrates a block diagram of the communication controller 140 of an example embodiment.

As shown in FIG. 4, the communication controller 140 may include processing circuitry 310 that may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of a programmable computer.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be configured to generate control consoles, user interface icons, control menus, option selections, input boxes, display-based interaction mechanisms, and/or the like by which the user 44 may be enabled to provide instructions or other inputs for interaction with the server 120 and/or the robotic mower 10. As such, in some embodiments, the processor 312 (or the processing circuitry 310) may be said to cause each of the operations described in connection with the communication controller 140 by directing the communication controller 140 to undertake the corresponding functionalities responsive to execution of instructions or algorithms configuring the processor 312 (or processing circuitry 310) accordingly. These instructions or algorithms may configure the processing circuitry 310, and thereby also transform the communication controller 140, into a tool for performing corresponding functions in the physical world in accordance with the instructions provided such as, for example, providing interface mechanisms for controlling the operation of the robotic mower 10 relative to mowing, gathering data, reporting data gathered or other activity, and/or the like, for controlling the pairing of the robotic mower 10 with the electronic device, and/or for updating or modifying programs or applications that relate to settings or other activities of the accounts and devices associated with accounts that the user 44 of the electronic device 42 is authorized to access.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the communication controller 140 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. Among the contents of the memory 314, applications may be stored for execution by the processor 312 in order to carry out the functionality associated with each respective application. In some cases, the applications may include an application for providing the interface consoles, screens, prompts and/or the like to enable the user 44 to interface with the robotic mower 10 or interface with an account associated with the robotic mower 10, the parcel 20 or an organization associated with the robotic mower 10, the user 44, or the parcel 20.

The user interface 330 may be in communication with the processing circuitry 310 to receive an indication of a user input at the user interface 330 and/or to provide an audible, visual, mechanical or other output to the user 44. As such, the user interface 330 may include, for example, a display, one or more buttons or keys (e.g., function buttons, keyboard, etc.), and/or other input/output mechanisms (e.g., microphone, speakers, cursor, joystick, lights and/or the like).

The device interface 320 may include one or more interface mechanisms for enabling communication with other devices either locally or remotely (e.g., the remote mower 10 or the other remote vehicles). In some cases, the device interface 320 may be any means such as a device or circuitry embodied in either hardware, or a combination of hardware and software that is configured to receive and/or transmit information or data from/to devices or other components in communication with the processing circuitry 310. In some example embodiments, the device interface 320 may provide interfaces for communication of data to and/or from the remote mower 10 or the other remote vehicles via wired or wireless communication interfaces in a real-time manner. Interfaces for directing remote control of such vehicles may be provided as a data package downloaded from the server 120 in one or more burst transmissions of any kind.

Figure 5:
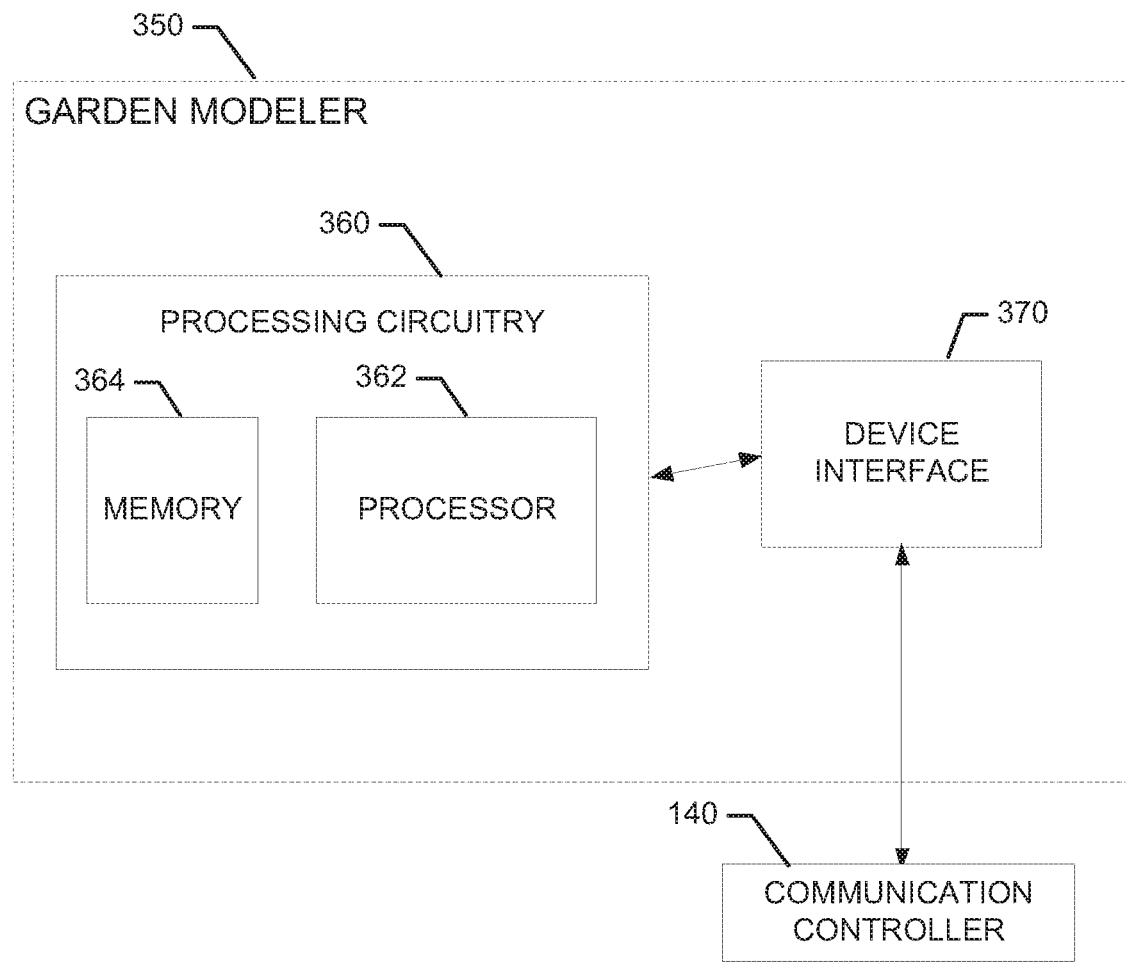
FIG. 5 illustrates a block diagram of various components of processing circuitry of a garden modeler to illustrate some of the components that enable or enhance the functional performance of the garden modeler and to facilitate description of an example embodiment.

In some embodiments, the server 120 may include the garden modeler 350, which may be embodied as or otherwise include processing circuitry 360. The processing circuitry 360 may include a processor 362 and memory 364 as shown in FIG. 5. The processing circuitry 360 may also include a device interface 370. The processor 362, memory 364 and device interface 370 may be similar in function (and in some cases also form) to the processor 312, memory 314 and device interface 320 described above. Thus, specific descriptions of these components will not be repeated.

The garden modeler 350 may be embodied as any device or means embodied in either hardware, software, or a combination of hardware and software configured to provide the interfaces and executable instructions for modeling data associated with the robotic mower 10 (or other robotic vehicles) or the parcel 20. Thus, for example, the garden modeler 350 may, in some cases, include an application having stored instructions that when executed by hardware (i.e., the processing circuitry 360), cause the processing circuitry 360 to be transformed into a tool for uploading data (e.g., image data, position data, etc.). As such, the garden modeler 350 may control storage and management of data (e.g., image data, position data, etc.), error notification, connectivity, analytics, fleet management, and remote control functions. Modeled data may be maintained at the server 120. Additionally, a listing of all distributed assets (i.e., robotic vehicles) may also be stored at the server 120. More information about some of these services is provided herein.

In an example embodiment, the processor 362 (or the processing circuitry 360) may be said to cause each of the operations described in connection with the garden modeler 350 by directing the garden modeler 350 to undertake the corresponding functionalities responsive to execution of instructions or algorithms configuring the processor 362 (or processing circuitry 360) accordingly. These instructions or algorithms may configure the processing circuitry 360, and thereby also transform the garden modeler 350, into a tool for performing corresponding functions in the physical world in accordance with the instructions provided such as, for example, directing the operation of the robotic mower 10 relative to mowing, gathering data, reporting data gathered or other activity, and/or the like, receiving instructions from a user 44 at the electronic device 42, and/or the like.

In an exemplary embodiment, the memory 364 may be configured to store information, data, applications, instructions or the like for enabling the garden modeler 350 to carry out various functions in accordance with exemplary embodiments of the present invention. For example, the memory 364 could be configured to buffer input data for processing by the processor 362. Additionally or alternatively, the memory 364 could be configured to store instructions for execution by the processor 362. As yet another alternative, the memory 364 may include one or more databases that may store a variety of data sets responsive to input from various sensors or components of the robotic mower 10. Among the contents of the memory 364, applications may be stored for execution by the processor 362 in order to carry out the functionality associated with each respective application. In some cases, the applications may include an application for storing and manipulating collected data; facilitating setting up of communication links between paired devices; storing information such as routes, programs, task lists and/or the like. Additionally or alternatively, for example, the applications may include one or more algorithms for directing operation of the robotic mower 10 for capturing data, mowing, performing other actions, and/or the like. In some cases, one or more applications may be provided for data aggregation, notifications, adjusting settings, fleet management and/or the like as described herein.

As can be appreciated from the descriptions above, in some cases, the programmatic control may include programming the robotic mower 10 to respond to certain situations detected at the robotic mower 10. Thus, certain conditions detected (e.g., via the sensor network 190) may trigger corresponding responses and the conditions and/or responses may be programmed using the garden modeler 350. In some cases, the sensor network 190 may detect when the robotic mower 10 is removed from the parcel 20. In such cases, a local alarm at the robotic mower 10 may be triggered. Additionally or alternatively, a notification may be sent from the robotic mower 10 to the server 120 and/or the electronic device 42 to alert the user 44 of the removal from the parcel 20 (e.g., via email, MMS or other alerting mechanisms). In other cases, the robotic mower 10 may be programmed to avoid operation during certain detectable weather conditions (or when such conditions are reported via internet connection), or avoid operation when other yard maintenance equipment is operating (e.g., when an irrigation system is operating).

In some embodiments, position and status updates may routinely, continuously, or periodically be provided to the server 120 and/or the electronic device 42. If provided to the server 120, the user 44 may be enabled to monitor such status information when logged in at the electronic device 42. However, the garden modeler 350 may enable the user 44 to define specific events or triggers that will cause the server 120 to notify the user 44 upon any such occurrences being reported to the server 120. Error or fault conditions may also result in notifications being provided from the robotic mower 10 to the server 120 and/or the electronic device 42. Other conditions, such as service related conditions, may be monitored at the server 120 and the user 44 may be notified when corresponding service conditions warrant attention. Data for troubleshooting or other analytics may also be provided from the robotic mower 10 to the server 120 and/or the electronic device 42. Thus, the garden modeler 350 may further provide a mechanism by which to troubleshoot various device performance issues.

Figure 6:
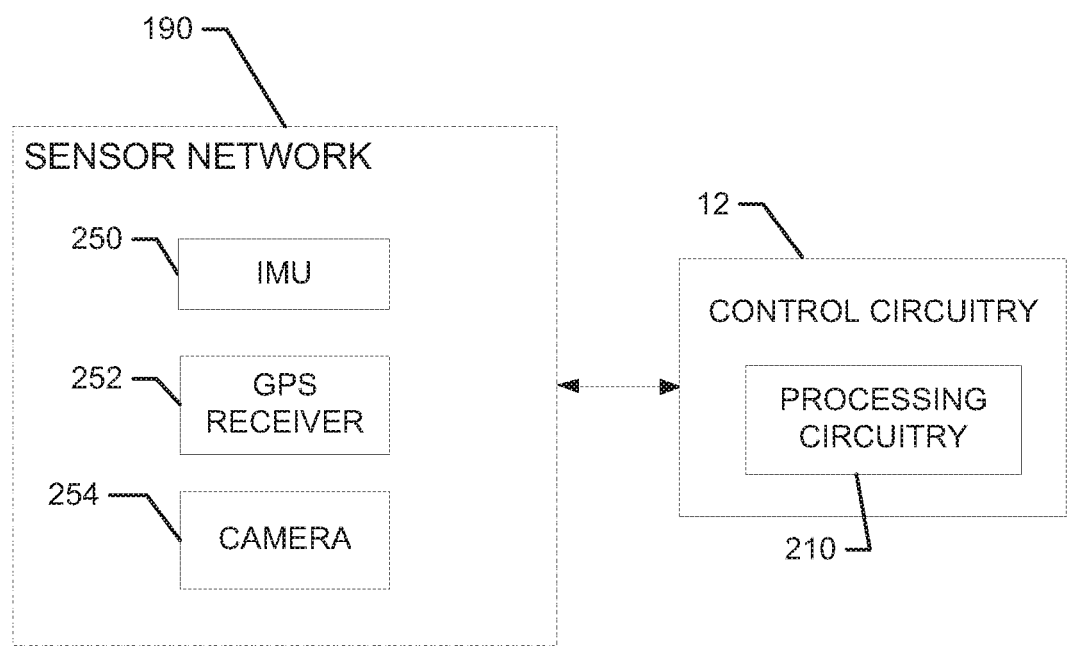
FIG. 6 illustrates a block diagram of some components that may be employed as part of a sensor network in accordance with an example embodiment.

In an example embodiment, the sensor network 190 may provide data to the modules described above to facilitate execution of the functions described above, and/or any other functions that the modules may be configurable to perform. In some cases, the sensor network 190 may include (perhaps among other things) any or all of inertial measurement unit (IMU) 250, a GPS receiver 252, and a camera 254, as shown in FIG. 6. In this regard, FIG. 6 illustrates a block diagram of some components that may be employed as part of the sensor network 190 in accordance with an example embodiment.

The sensor network 190 may include independent devices with on-board processing that communicate with the processing circuitry 210 of the control circuitry 12 via a single data bus, or via individual communication ports. However, in some cases, one or more of the devices of the sensor network 190 may rely on the processing power of the processing circuitry 110 of the control circuitry 12 for the performance of their respective functions. As such, in some cases, one or more of the sensors of the sensor network 190 (or portions thereof) may be embodied as portions of the positioning module 180.

The IMU 250 may include one or more and any or all of combinations of accelerometers, odometers, gyroscopes, magnetometers, compasses, and/or the like. As such, the IMU 250 may be configured to determine velocity, direction, orientation and/or the like so that dead reckoning and/or other inertial navigation determinations can be made by the control circuitry 12. The IMU 250 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 10 relative to a known location. For example, navigation conducted via the IMU 250 may be used for robotic mower 10 operation for a period of time, and then a correction may be inserted when a GPS fix is obtained on robotic mower position. As an example alternative, the IMU 250 determined position may be updated every time the robotic mower 10 returns to the charge station 40 (which may be assumed to be at a fixed location). In still other examples, known reference points may be disposed at one or more locations on the parcel 20 and the robotic mower 10 may get a fix relative to any of such known reference points when the opportunity presents itself. The IMU 250 determined position may then be updated with the more accurate fix information.

In some embodiments, the GPS receiver 252 may be embodied as a real time kinematic (RTK)—GPS receiver. As such, the GPS receiver 252 may employ satellite based positioning in conjunction with GPS, GLONASS, Galileo, GNSS, and/or the like to enhance accuracy of the GPS receiver 252. In some cases, carrier-phase enhancement may be employed such that, for example, in addition to the information content of signals received, the phase of the carrier wave may be examined to provide real-time corrections that can enhance accuracy.

In an example embodiment, the robotic mower 10 is provided with a camera 254 in addition to any other sensors or functional components 200 that the robotic mower 10 may carry. The camera 254, and perhaps also other sensor equipment, may be configured to gather image data and other information during operation of the robotic mower 10 on the lawn (i.e., on the parcel 20). The image data may be combined with positioning information to generate a model 280 (e.g., a 2D or 3D model) of the parcel 20. The user 44 may then interact with the model 280 to undertake a variety of activities including, for example, defining work areas and/or tasks to be performed in various areas, recording content for presentation in association with the time the content was recorded to provide an event log with accessible image content, detecting/notifying the operator of various changes to the environment, and/or the like. Other functions may also be performed as described in greater detail below.

In an example embodiment, the positioning module 180 may be configured to incorporate input from a plurality of sources (e.g., among sensor network 190 components that can generate an estimated position or cooperate to generate an estimated position) to generate a composite position based on the position information received from each of the various sources available. Thus, for example, each sensor (or at least multiple sensors) may provide separate information that can be used by the positioning module 180 to determine a corresponding position estimate. Each position estimate may also have a weight associated therewith based on time, accuracy estimates or other factors. The positioning module 180 may then calculate the composite position based on a weighted average of the individual position estimates from each respective source that has an input to provide. In some cases, predicted positions may further be determined based on current inputs, system model information, and previous state information.

In some example embodiments, rather than (or in addition to) estimating a composite position, the positioning module 180 may be configured to rank or order position estimates based on a confidence score associated with each position input provided from the various sources available. The position estimate with the highest confidence score may then be selected as the current estimated position. Additionally or alternatively, the positioning module 180 may be configured to use one or more of the available sensors as a primary sensor for determining position. The positioning module 180 may also be configured to "reset" or update the primary sensor as appropriate if a more accurate position source becomes available (e.g., as in the example of resetting the IMU 250 when a more accurate position source is available).

Figure 7:
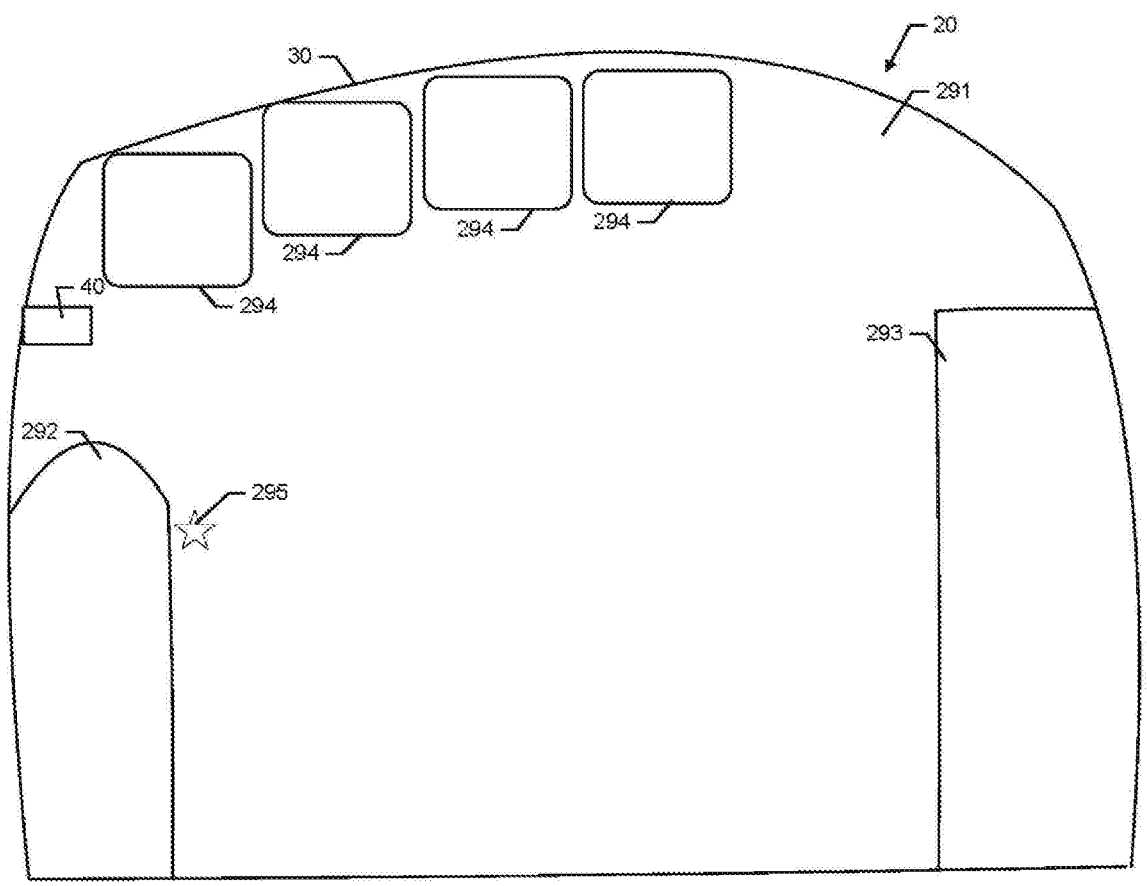
FIG. 7 illustrates a graphical representation of a parcel in accordance with an example embodiment.

FIG. 7 illustrates a graphical representation of a parcel 20 in accordance with an example embodiment. The graphical representation of FIG. 7 is a 2D representation similar to a map view, but could easily be converted to 3D by the addition of topographical contour lines or other features (e.g., image views) to indicate features having a height dimension. The parcel 20 of FIG. 7 has the boundary 30 and charge station 40 indicated as described above. However, the parcel 20 also has a work area 291 defined along with a first exclusion area 292 and a second exclusion area 293. The first and second exclusion areas 292 and 293 may be designated by the operator 44 as cultivated areas that the robotic mower 10 is to avoid. However, the work area 291 may be defined as an area that is to be mowed in its entirety. Various structures (e.g., bushes 294) are also represented, and may be appreciated by the robotic mower 10 as inaccessible areas due to the existence of a structure at the location.

In some embodiments, each location in the parcel 20 may be assigned a grid position or other regional identifier. Content items may be associated with the grid positions and may be accessed by the operator 44 interacting with (e.g., selecting or requesting) the content items associated with each grid position. As mentioned above, the content items may be registered sequentially by time and by location. In some cases, the most recent content item for any particular grid position may be the default content item shown for each location when the operator 44 selects a grid location. Alternatively, an icon, thumbnail view, or other indicator (e.g., content item indicator 295) may be placed on the map view itself, and the user 44 may select the indicator to view image data for the location. Selection of the indicator 295 may show the most recently gathered image associated with the location. In some cases, the operator 44 may cycle through other images associated with the location in a manner similar to a slide show presentation arranged by time. However, the operator 44 could also designate specific times or time ranges.

In some embodiments, the robotic mower 10 may traverse the parcel 20 gathering image data and all such data may be recorded in association with the location at which it was gathered, as described above. The robotic mower 10 could transmit the image and location information to the charge station 40 or another remote electronic device 42 during operation (wirelessly) or could download the information to the charge station 40 (wired) while charging. In some cases, the operator 44 could even direct the robotic mower 10 to proceed to a specific location to obtain image data and direct the gathering of content items.

Accordingly, in some embodiments, the operator 44 may be enabled to take a virtual tour through the various locations of the parcel 20 and retrieve data and/or images that are associated with each of the various locations. The operator 44 may, for example, pass a mouse over various locations on a map view of the model 280 and select or otherwise be automatically presented with content items associated with each of the various locations. Moreover, when the timeline function is employed, the virtual tour may be associated with a specifically selected time or time period. As such, the operator 44 may be able to retrieve current, historical, or time-lapse image data for a given location by selecting that location on an interactive graphical display. This interactive graphical display may comprise at least one of a model, a satellite based map view, a time-lapse display, or an image library. In certain embodiments, the interactive graphical display may be a satellite based map view. In such embodiments, the interactive graphical display may be used to at least one of updating satellite based map services, enhancing satellite images for satellite based map services, or enabling shifting perspectives from an aerial view to a street level view. In such embodiments, the satellite based map services may comprise at least one of Google Street View or Google Earth. In other embodiments, the interactive graphical display may be an image library, wherein the image library is segmented based on at least one of time or location. Furthermore, real time touring may also be possible if the operator 44 selects to view live data or even direct the robotic mower 10 to conduct a tour and send real-time or recent data for viewing. The live view or real-time data may also be used, for example, to generate a first person view that the operator 44 could employ via a remote electronic device 42 to direct operation of the robotic mower 10.

The timeline function may serve as an event log so that potential problems or changes of interest may be identified either automatically or by the operator 44. For example, logged data may include pictures or image data taken of various structures or situations on the parcel 20. The image data may be presented to the operator 44 so the operator 44 can identify or appreciate the changes, or image processing techniques may be employed to compare images of the same area at different times to identify objects or other changes and the operator 44 may be notified of such changes (e.g., via email, MMS, or other alerting mechanisms). Accordingly, for example, the garden modeler 350 may be configured to perform automatic change detection (e.g., based on image comparisons) and notification based, in some cases, on logged data. The logged data may therefore include images, sensor readings, component activity data and/or the like for given times or periods of time. Accordingly, for example, problems such as the robotic mower 10 getting stuck, areas with bad GPS coverage, areas with poor grass quality, swampy or dry areas, and/or the like may be identified and associated with the locations and times during which such conditions occurred. The information may be used to define areas that the robotic mower 10 should avoid or take special actions when entering such areas. The occurrence of certain natural or artificial phenomena may therefore be monitored, such as the growth of grass over time and changes in the garden through the seasons on the parcel 20.

In some situations, privacy may be an important consideration relative to the gathering of image data. In particular, for example, it may be undesirable to present image data relating to structures, objects or people that are not on the parcel 20, but are visible by the robotic mower 10 during operation on the parcel 20. Accordingly, in some embodiments, the garden modeler 350 may be further configured to mask image data that is determined to correspond to areas outside the boundary 30 of the parcel 20. For example, the garden modeler 350 may be configured to identify objects in image data captured by the camera 254 and estimate a distance to the identified objects. If the objects are estimated to be at distances that would place the objects outside the boundary 30, the garden modeler 350 may be configured to employ an image masking algorithm to blur, obstruct, or otherwise mask the image data relative to the objects that are outside the boundary 30. However, objects inside the boundary 30 may be presented with normal resolution and the model 280 may faithfully reproduce such content as much as possible. In some cases, the camera 254 may be a stereo camera, or other ranging techniques may be employed to enable the garden modeler 350 to determine a range to the objects in an image.

Based on the description above, it should be appreciated that the garden modeler 350 may be configured to enable image data to be combined with position data to generate location aware processing of data for creation of a virtual garden in the form of model 280. The virtual garden may be a 2D or 3D representation of the garden and may include content items that include image data and perhaps other sensor data that is correlated by time and/or location with the representation of the garden. The operator 44 may therefore be enabled to conduct a virtual inspection of the garden from anywhere in the world in an intuitive and natural way. Various problems, obstacles, and items in the garden may be automatically or manually identified by reviewing image data content items so that the overall quality of lawn and garden activities (e.g., mowing) may be improved. Additionally, automatic masking of image data for objects outside boundaries of the parcel 20 on which the robotic mower 10 operates may also be accomplished to address any privacy concerns.

Embodiments of the present invention may therefore be practiced using an apparatus such as the one depicted in FIGS. 3-7, in connection with the system of FIG. 2. However, it should also be appreciated that some embodiments may be practiced in connection with a computer program product for performing embodiments or aspects of the present invention. As such, for example, each block or step of the flowcharts of FIGS. 8-10, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214, 314 and/or 364) and executed by processing circuitry (e.g., processor 212, 312 and/or 362).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 8-10. Moreover, other methods derived from the descriptions provided herein may also be performed responsive to execution of steps associated with such methods by a computer programmed to be transformed into a machine specifically configured to perform such methods.

Figure 8:
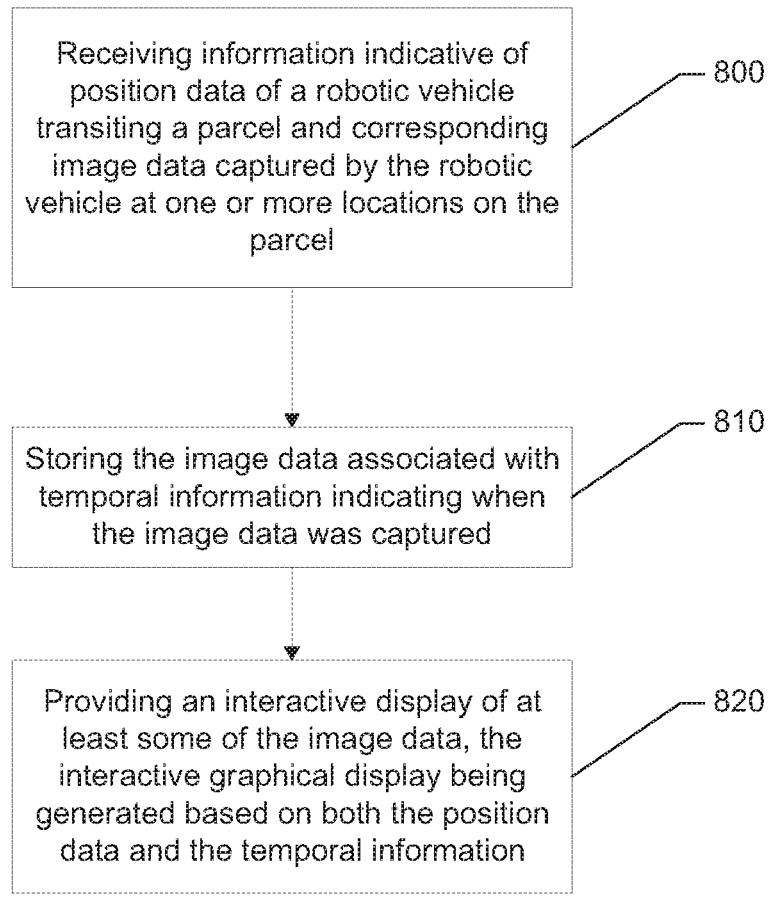
FIG. 8 illustrates a block diagram of a method according to an example embodiment.

In an example embodiment, a method for collecting and modeling image data according to FIG. 8 may include receiving information indicative of position data of a robotic vehicle 10 transiting a parcel 20 and corresponding image data captured by the robotic vehicle 10 at one or more locations on the parcel 20 at operation 800, storing the image data associated with temporal information indicating when the image data was captured at operation 810, and providing an interactive graphical display of at least some of the image data, the interactive graphical display being generated based on both the position data and the temporal information at operation 820.

Figure 9:
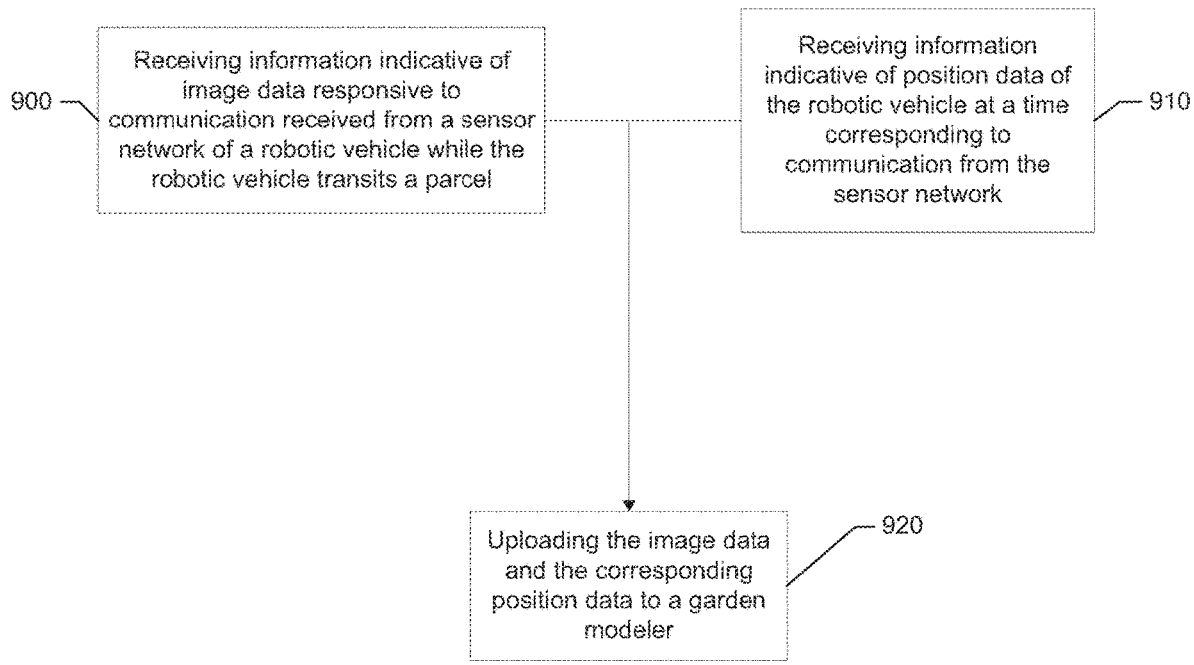
FIG. 9 illustrates a block diagram of a method according to an example embodiment.

In an example embodiment, a method for collecting and uploading image data according to FIG. 9 may include receiving information indicative of image data responsive to communication received from a sensor network 190 of a robotic vehicle 10 while the robotic vehicle 10 transits a parcel 20 at operation 900, receiving information indicative of position data of the robotic vehicle 10 at a time corresponding to communication from the sensor network 190 at operation 910, and uploading the image data and the corresponding position data to a garden modeler 350 at operation 920.

Figure 10:
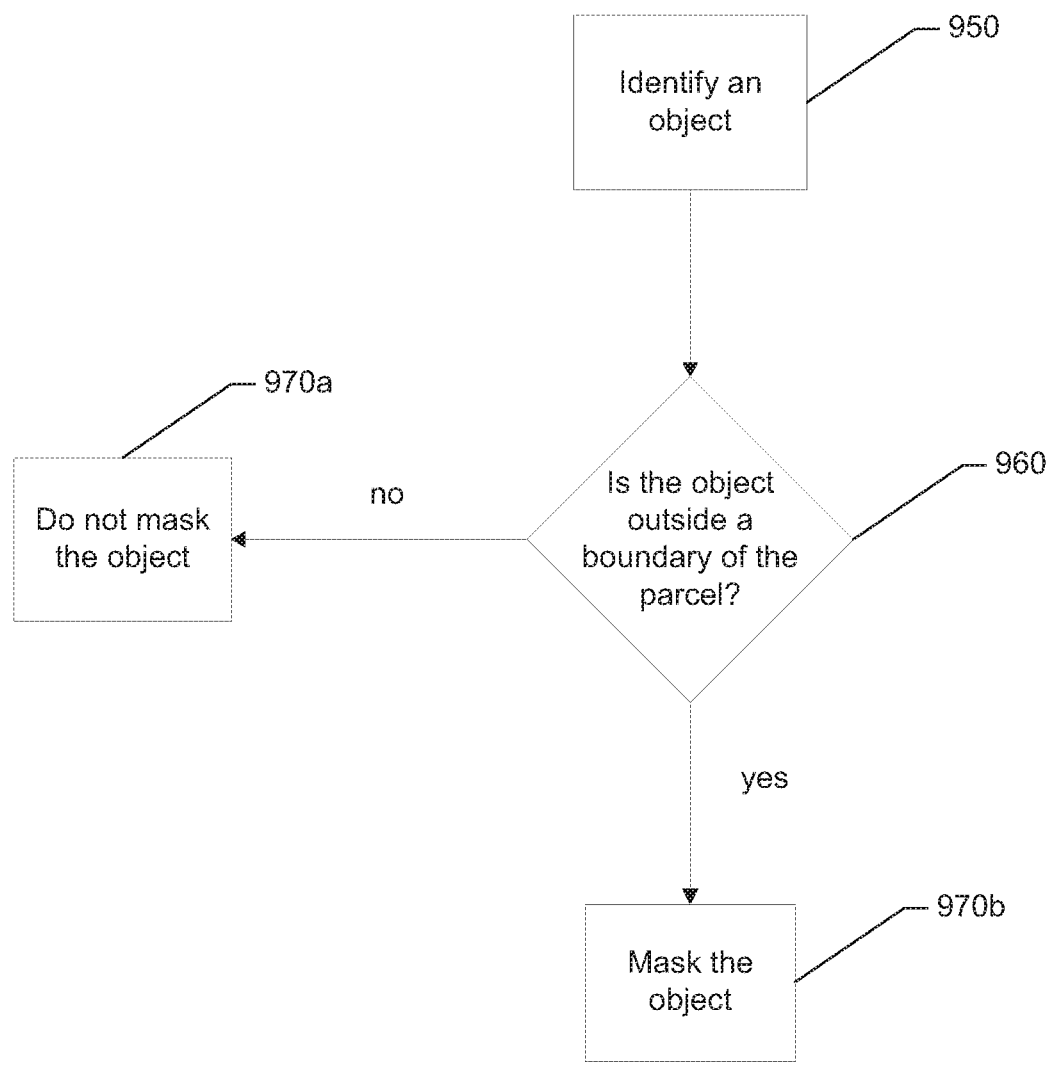
FIG. 10 illustrates a control flow diagram of one example of how a robotic mower can be operated to mask objects outside of a boundary of a parcel in accordance with an example embodiment.

FIG. 10 illustrates a control flow diagram of one example of how the robotic mower 10 can be operated to mask objects outside of a boundary 30 of a parcel 20 in accordance with an example embodiment. As shown in FIG. 10, operation may begin with identifying an object at operation 950. The operation may continue at operation 960 by making a decision as to whether the object is outside a boundary 30 of the parcel 20. In this regard, if the decision is that the object is not outside a boundary 30 of the parcel 20, then the garden modeler 350 will not mask the object at operation 970*a*. However, if the decision is made that the object is outside a boundary 30 of the parcel 20, then the garden modeler 350 will mask the object at operation 970*b*.

As such, in some cases, the robotic mower 10 may generally operate in accordance with a control method that combines the modules described above to provide a functionally robust robotic vehicle. In this regard, a method according to example embodiments of the invention may include any or all of the operations shown in FIG. 10. Moreover, other methods derived from the descriptions provided herein may also be performed responsive to execution of steps associated with such methods by a computer programmed to be transformed into a machine specifically configured to perform such methods.

In an example embodiment, an apparatus for performing the methods of FIGS. 8-10 above may comprise processing circuitry (e.g., processing circuitry 360) that may include a processor (e.g., an instance of the processor 362 at the server 120) configured to perform some or each of the operations (800-820, 900-920, 950-970*b*) described above. The processing circuitry 360 may, for example, be configured to perform the operations (800-820, 900-920, 950-970*b*) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-820, 900-920, 950-970*b*) may comprise, for example, the processing circuitry 360.

Figure 11:
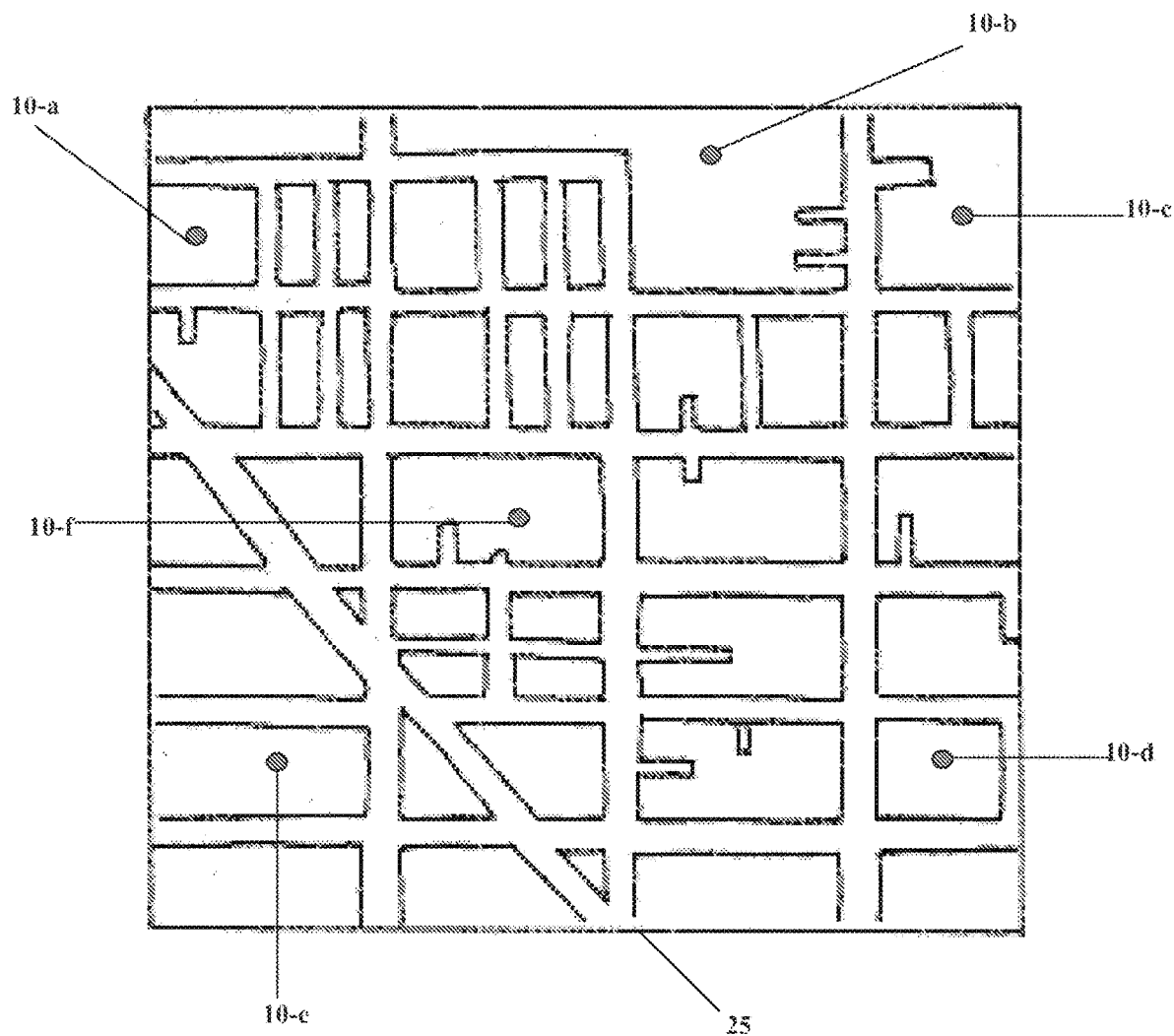
FIG. 11 illustrates an example operating environment for a plurality of robotic mowers according to an example embodiment.

FIG. 11 illustrates an example operating environment for a plurality of robotic mowers according to an example embodiment. As shown in FIG. 11, a plurality of robotic mowers 10-*a*, 10-*b*, 10-*c*, 10-*d*, 10-*e*, 10-*f* are distributed at various positions throughout a geographical area 25. The plurality of robotic mowers 10-*a*, 10-*b*, 10-*c*, 10-*d*, 10-*e*, 10-*f* collect position data using their respective position modules 180 and image data using their respective sensor networks 190 at each position throughout the geographical area 25. Each of the plurality of robotic mowers 10-*a*, 10-*b*, 10-*c*, 10-*d*, 10-*e*, 10-*f* then upload this image and position data to the garden modeler 350, which models the data into an interactive garden model 280.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   receiving information indicative of position data of a robotic vehicle transiting a parcel and corresponding image data captured by the robotic vehicle at one or more locations on the parcel;
   storing the image data associated with temporal information indicating when the image data was captured;
   applying a mask function to the image data; and
   providing, at a terminal remotely located relative to the robotic vehicle, an interactive graphical display of at least some of the image data, the interactive graphical display being generated based on both the position data and the temporal information to display map data associated with the parcel along with the at least some of the image data corresponding to a respective location at which the at least some of the image data was captured,
   wherein applying the mask function to the image data comprises:
      identifying an object in the image data;
      estimating a first distance, the first distance being from a location of the robotic vehicle to an estimated location of the object;
      estimating a second distance, the second distance being from the location of the robotic vehicle to a location of a boundary of the parcel; and
      in response to the first distance being greater than the second distance, masking the object relative to the image data determined to be within the boundary of the parcel when providing the at least some of the image data on the interactive graphical display, and
   wherein the interactive graphical display comprises at least one of a model, a satellite based map view, a time-lapse display, or an image library.

2. The method of claim 1, wherein the interactive graphical display is a satellite based map view, the method further comprising at least one of updating satellite based map services, enhancing satellite images for satellite based map services, or enabling shifting perspectives from an aerial view to a street level view.

3. The method of claim 1, wherein the interactive graphical display is an image library, wherein the image library is segmented based on at least one of time or location.

4. The method of claim 1, wherein the interactive graphical display is a model, the method further comprising:
   generating a model of the parcel based on the information received;
   providing a graphical representation of the parcel based on the model; and
   enabling an operator to interact with the graphical representation to view one or more content items associated with respective ones of the one or more locations.

5. The method of claim 4, further comprising updating the model based on supplemental image data or supplemental location information received from an external device, the graphical representation being provided based on the model after updating.

6. The method of claim 4, wherein providing the graphical representation comprises providing an event log defining a series of events in association with the respective ones of the one or more locations.

7. The method of claim 6, wherein the event log comprises a plurality of images associated with the respective ones of the one or more locations at a selected time or range of times.

8. The method of claim 1, further comprising enabling an operator to select a location on the interactive graphical display and retrieve image data for the location.

9. The method of claim 1, wherein the image data comprises at least one of current image data, historical image data, time-lapse image data, or combinations thereof.

10. The method of claim 1, further comprising comparing images taken at different times at a same location to identify a change based on the images compared.

11. A robotic vehicle comprising:
    control circuitry configured to direct movement of the robotic vehicle;
    a sensor network; and
    processing circuitry configured to:
    receive information indicative of position data of a robotic vehicle transiting a parcel and corresponding image data captured by the robotic vehicle at one or more locations on the parcel;
    store the image data associated with temporal information indicating when the image data was captured; and
    provide, at a terminal remotely located relative to the robotic vehicle, each of an interactive graphical display of a map of the parcel generated based on the position data and an image library comprising at least some of the image data, wherein the image data is configured to be accessed on the map by an operator in relation to the temporal information and a respective location at which the image data was captured,
    wherein the image data comprises current, historical, and time-lapse image data, and
    wherein the sensor network comprises at least one of an inertial measurement unit (IMU), a global positioning system (GPS) receiver, a camera, or combinations thereof.

12. The robotic vehicle of claim 11, wherein the map is a satellite based map that is configured to be shifted from an aerial view to a street level view by the operator.

13. The robotic vehicle of claim 11, wherein the processing circuitry is further configured to perform an automatic change detection on the image data, the automatic change detection comparing the image data to previously stored image data corresponding to a same location to identify a change to the parcel.

14. The robotic vehicle of claim 13, wherein in response to identifying the change to the parcel, the processing circuitry is even further configured to notify the operator of the identified change.

15. A method comprising:
    receiving information indicative of position data of a robotic vehicle transiting a parcel and corresponding image data captured by the robotic vehicle at one or more locations on the parcel;
    storing the image data associated with temporal information indicating when the image data was captured;
    applying a mask function to the image data;
    providing, at a terminal remotely located relative to the robotic vehicle, an interactive graphical display of at least some of the image data, the interactive graphical display being generated based on both the position data and the temporal information to display map data associated with the parcel along with the at least some of the image data corresponding to a respective location at which the at least some of the image data was captured;

retrieving image data for a location on the parcel in response to an operator selecting the location on the interactive graphical display; and comparing images taken at different times at a same location to identify a change based on the images compared, wherein applying the mask function to the image data comprises:

identifying an object in the image data;

estimating a first distance, the first distance being from a location of the robotic vehicle to an estimated location of the object;

estimating a second distance, the second distance being from the location of the robotic vehicle to a location of a boundary of the parcel; and in response to the first distance being greater than the second distance, masking the object relative to the image data determined to be within the boundary of the parcel when providing the at least some of the image data on the interactive graphical display.

* * * * *